(12) United States Patent
Mei et al.

(10) Patent No.: US 11,105,779 B2
(45) Date of Patent: Aug. 31, 2021

(54) PRESSURE SYSTEM FOR LIQUID CHROMATOGRAPHY

(71) Applicants: Longyuan Mei, Lexington, MA (US); Longzhi Mei, Lexington, MA (US); Longyu Mei, Lexington, MA (US)

(72) Inventors: Longyuan Mei, Lexington, MA (US); Longzhi Mei, Lexington, MA (US); Longyu Mei, Lexington, MA (US)

( * ) Notice: Subject to any disclaimer, the term of this patent is extended or adjusted under 35 U.S.C. 154(b) by 0 days.

(21) Appl. No.: 16/269,559

(22) Filed: Feb. 6, 2019

(65) Prior Publication Data

US 2019/0170709 A1      Jun. 6, 2019

Related U.S. Application Data

(63) Continuation-in-part of application No. 15/240,599, filed on Aug. 18, 2016, now Pat. No. 10,239,744.

(60) Provisional application No. 62/206,303, filed on Aug. 18, 2015, provisional application No. 62/781,694, filed on Dec. 19, 2018.

(51) Int. Cl.
  *G01N 30/36*      (2006.01)
  *G01N 30/32*      (2006.01)

(52) U.S. Cl.
  CPC ............. *G01N 30/36* (2013.01); *G01N 30/32* (2013.01); *G01N 2030/326* (2013.01); *G01N 2030/328* (2013.01)

(58) Field of Classification Search
  CPC .. G01N 30/36; G01N 30/32; G01N 2030/326; G01N 2030/328; G01N 35/10
  See application file for complete search history.

(56) References Cited

U.S. PATENT DOCUMENTS

| | | | | |
|---|---|---|---|---|
| 6,532,978 | B1 * | 3/2003 | Muller-Kuhrt | G05D 11/132 137/1 |
| 6,743,356 | B1 * | 6/2004 | Fermier | G01N 30/32 210/143 |
| 9,731,954 | B2 ‡ | 8/2017 | Blackburn | B67D 1/0004 |
| 2015/0041009 | A1 * | 2/2015 | Gebauer | F16K 15/145 137/606 |

* cited by examiner
‡ imported from a related application

*Primary Examiner* — Jason K Niesz
(74) *Attorney, Agent, or Firm* — O'Banion & Ritchey LLP; John P. O'Banion

(57) ABSTRACT

A pressure system for liquid chromatography allows multiple fluid lines to be driven in parallel by a single pump. A fluid pressure medium supply provides fluid pressure to the system. The fluid pressure medium supply is connected to a plurality of fluid transfer pipes, each with a flow limiter. The fluid pressure medium supply is configured to provided more flow than the flow limiters combined, and excess flow is either diverted with a pressure limiter or reduced with a pressure adjuster, or both. Further layers of pressure and flow control may be added with additional pressure limiters and/or pressure adjusters and flow limiters connected together. In some cases, multiple lines containing different fluids may be driven by the same pressure source through the use of flexible fluid delivery inner containers, each within a rigid container that is pressurized by the pressure source.

12 Claims, 9 Drawing Sheets

PRESSURE SYSTEM FOR LIQUID CHROMATOGRAPHY

The current application is a continuation-in-part (CIP) application of a U.S. non-provisional application Ser. No. 15/240,599 filed on Aug. 18, 2016. The U.S. non-provisional application Ser. No. 15/240,599 claims a priority to a U.S. provisional application Ser. No. 62/206,303 filed on Aug. 18, 2015.

The current application also claims a priority to the U.S. Provisional Patent application Ser. No. 62/781,694 filed on Dec. 19, 2018.

FIELD OF THE INVENTION

The present invention relates generally to fluid transport. More particularly, the present invention relates to liquid chromatography.

BACKGROUND OF THE INVENTION

The present invention is in the technical field of chromatography, particularly column chromatography that needs pressure to push fluid through, such as gas chromatography (GC) and liquid chromatography(LC); More particularly, the present invention is in the technical field of analytical and preparative high pressure liquid chromatography (HPLC, also called high performance liquid chromatography), including ultra high pressure liquid chromatography (UHPLC, or UPLC), fast protein liquid chromatography (FPLC), etc.

In this document, we mainly mention HPLC as the examples of the application of the present invention, but in fact it is applicable to all the related fields with the same or similar principle.

Currently, pressure devices used in e.g. high pressure liquid chromatography (HPLC) essentially consist of a pump with two plungers which pump out liquid in turn continuously. The pump draws the mobile phase directly into the pump, and then presses the mobile phase out to a column via a pipe.

In the above mentioned current technique, one pump serves only one column, so that only one sample is analyzed in a given time. Since the pump is usually expensive, this arrangement is low in efficiency and performance/cost ratio. There are similar situations in application fields other than HPLC. In the current technique of HPLC, one pump can only drive one mobile phase, and cannot drive two or more types of mobile phase simultaneously, which results in greatly limited applications. In addition, in the current technique of HPLC, a pump will contact directly with the mobile phase, which results in strict requirements on material and sealing of the pumps.

The present invention provides a pressure system suitable for applications such as, but not limited to liquid chromatography including HPLC, etc. It can deliver simultaneously multiple lines of different mobiles phases having different pressures with only one pressure source or pressure generator, e.g. a pump.

The present invention presents a new way to provide pressure for chromatography systems without the limitation mentioned above. With this invention, in an HPLC system, 1) one pump can serve multiple columns in parallel, even with different pressures and flow rates; this means that the device efficiency and performance/cost with be greatly increased; 2) one pump can drive multiple different types of mobile phase simultaneously; this means that the productivity and applicable range will be greatly improved; and 3) the pump can be isolated from mobile phases; this means that a pump with less strict requirements and less cost can be utilized.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1A:
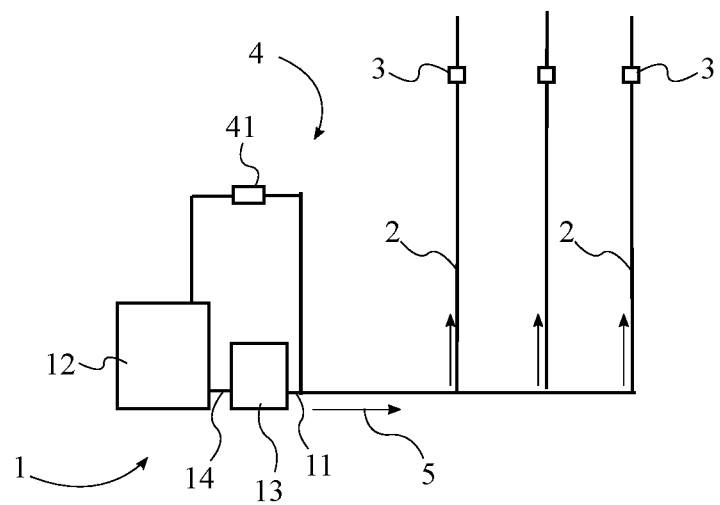
FIGS. 1A-1C show basic structures of some embodiments of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a pressure system for liquid chromatography wherein a single pump can drive multiple fluid lines in parallel. More particularly, the present invention can serve multiple columns in HPLC or other LC applications in parallel with the single pump, resulting in greater performance for less cost, improved productivity and applicable range, and less strict requirements for selection of the pump in such systems.

In general, the present invention comprises a fluid pressure medium supply 1, a first plurality of fluid transfer pipes 2, a first plurality of flow limiters 3, and a source pressure control unit 4, as seen in FIG. 1. It should be noted that the word "connect" (and "connection" and any variants) are used in this document to mean "flow-connect", that is, a fluid can flow between the parts being connected through the pipe that connects the parts.

In the present disclosure, the fluid pressure medium supply 1 is used as a general term for any device or combination of devices that is capable of driving fluid pressure medium through the system. Fluid pressure medium, for the purposes of the present disclosure, may be any suitable fluid for use in servicing multiple LC columns. The fluid pressure medium may be a mobile phase, or the fluid pressure medium may be another type of fluid that is useful in driving one or more mobile phases through one or more LC columns. For example, in some embodiments, the fluid pressure medium may be water. In some cases, the fluid pressure medium supply 1 may be, for example, a pipe which delivers fluid pressure medium from a pressure medium supply external to the present invention. In the preferred embodiment, the fluid pressure medium supply 1 is configured to provide a flow rate higher than that of all of the first plurality of flow limiters 3 combined. Excess flow and/or pressure is either discarded or recycled, thus ensuring that the flow rate through the first plurality of flow limiters 3 is steadily maintained.

The output 11 of the fluid pressure medium supply 1 is connected to each of the first plurality of fluid transfer pipes 2, wherein the fluid pressure medium supply 1 is configured to drive fluid pressure medium through the output 11 of the fluid pressure medium supply 1 toward the first plurality of fluid transfer pipes 2 along a pressure output path 5.

Each of the first plurality of flow limiters 3 is interconnected with one of the first plurality of fluid transfer pipes 2, wherein each of the first plurality of flow limiters 3 allows a specified flow rate of fluid, more particularly fluid pressure medium, through one of the first plurality of fluid transfer pipes 2.

The source pressure control unit 4 is configured to regulate the pressure of fluid pressure medium being delivered to the first plurality of fluid transfer pipes 2 from the fluid pressure medium supply 1.

In the preferred embodiment of the present invention, the fluid pressure medium supply 1 comprises at least one fluid reservoir 12 and a pressure source 13. The fluid reservoir 12 is used to store fluid pressure medium, and the pressure source 13 is configured to draw stored fluid pressure medium from the fluid reservoir 12 and drive fluid pressure medium through the system. In the preferred embodiment, the pressure source 13 is a fluid pump. Each fluid reservoir 12 is connected to an input 14 of the pressure source 13, and the pressure source 13 is configured to draw fluid pressure medium from the fluid reservoir 12 into the input 14 of the pressure source 13 and drive the fluid pressure medium through an output 11 of the pressure source 13. In embodiments where the pressure source 13 is a pump, the output 11 of the pressure source 13 is the output 11 of the fluid pressure medium supply 1.

In FIG. 1, fluid pressure medium from the reservoir 12 is driven by the pressure source 13 through the first plurality of flow limiters 3 via the fluid transfer pipes 2, to further be delivered to any next component in the system, e.g. HPLC columns. In the case of the pressure limiter 41 being used as exampled in FIG. 1A, since the pressure source 13 is set to provide flow more than the total taken by all the flow limiters 3, the liquid pressure between the pressure source and the fluid transfer pipes 2 builds up and when it is higher than the pressure setting of the pressure limiter 41, the extra liquid goes through the pressure limiter 41 to be restored into the fluid reservoir 12 for circulation. Alternatively, the extra liquid can be discarded. The pressure setting of the pressure limiter 41 is set lower than the pressure of the pressure source 13. The pressure limiter 41 is closed when liquid pressure is lower than its pressure setting, and it is open to allow overflow when liquid pressure is higher than its pressure setting, since the liquid supply from the pressure source 13 is always greater than the flow rate through all the flow limiters 3, and thus the pressure of the exampled embodiment will be kept stable constantly.

The source pressure control unit 4 functions to regulate the pressure of fluid pressure medium outputted from the fluid pressure medium supply 1. In one embodiment shown in FIG. 1A, the source pressure control unit 4 is a source pressure limiter 41 with a specified pressure setting. It is noted that the term "source" in "source pressure control unit 4," "source pressure limiter 41," and "source pressure adjuster 42" is used herein to denote that the referenced components are embodied in relation to the pressure source 13. The source pressure limiter 41 is interconnected between the output 11 of the fluid pressure medium supply 1 and an input 14 of the fluid pressure medium supply 1, and the source pressure limiter 41 is configured to allow passage of fluid pressure medium with a pressure higher than the specified pressure setting of the source pressure control unit 4. Thus, since the pressure source 13 of the fluid pressure medium supply 1 is configured to produce a flow rate greater than that of the first plurality of flow limiters 3 combined, excess output from the pressure source 13 is diverted. The excess output may either be discarded or transported back to the input 14 of the pressure source 13 to be recycled.

Figure 1B:
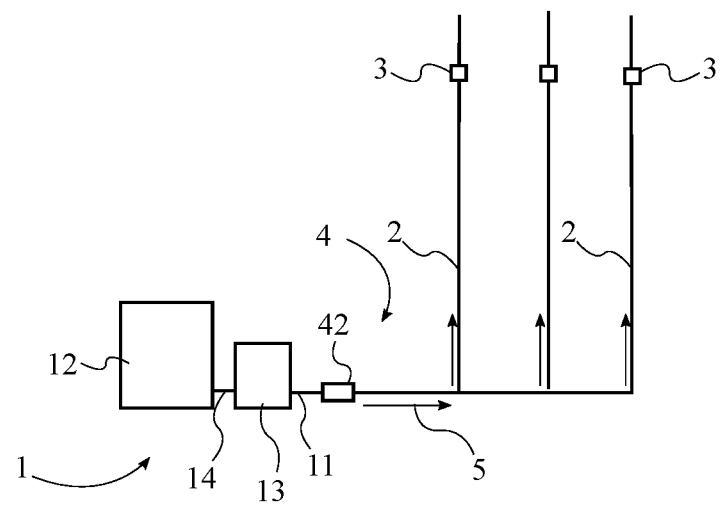

In another embodiment shown in FIG. 1B, the source pressure control unit 4 is a source pressure adjuster 42 with a specified pressure setting. The source pressure adjuster 42 is interconnected between the output 11 of the fluid pressure medium supply 1 and the first plurality of fluid transfer pipes 2. The source pressure adjuster 42 is configured to gradually close or open as the pressure of the fluid pressure medium within an outlet of the source pressure adjuster 42 approaches or departs from the specified pressure setting of the source pressure adjuster 42, respectively. The specified pressure setting of the source pressure control limit is set in such a way as to match the flow rate out from the source pressure adjuster 42 to the combined flow rate of the first plurality of flow limiters 3. In FIG. 1B, the pressure adjuster 42 is open to allow the flow to go through when the liquid pressure in the connected pipes or other components is lower than its pressure setting, and the path opening of the pressure adjuster 42 is adjusted smaller and even closed when the liquid pressure in the connected pipes becomes higher and finally reaches the pressure setting, since the liquid supply from the pressure source 13 is always greater than the outed liquid by all of the fluid transfer pipes 2 with the constant adjustment mentioned previously; thus, the pressure of the exampled system will be kept stable constantly.

Figure 1C:
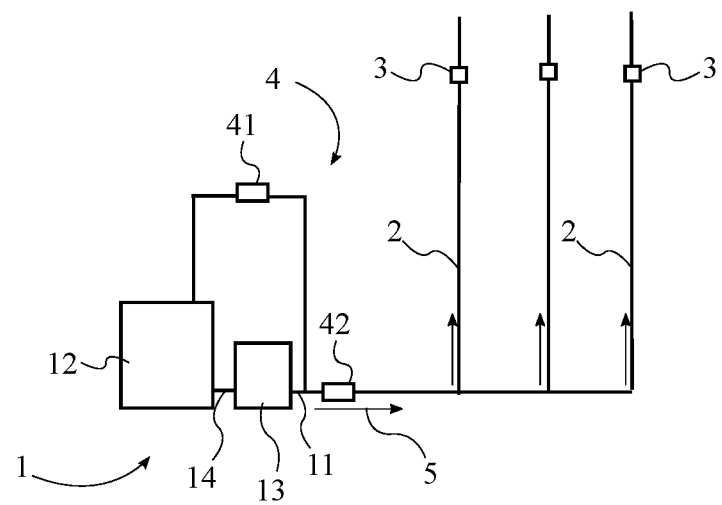

Furthermore, in another embodiment shown in FIG. 1C, the source pressure control unit 4 comprises both a source pressure limiter 41 with a specified pressure setting and a source pressure adjuster 42 with a specified pressure setting. The source pressure limiter 41 is interconnected between the output 11 of the fluid pressure medium supply 1 and the fluid reservoir 12, and is configured to allow passage of fluid pressure medium with a pressure higher than the specified pressure setting of the source pressure control unit 4. The source pressure adjuster 42 is interconnected between the output 11 of the fluid pressure medium supply 1 and the first plurality of fluid transfer pipes 2, and the source pressure adjuster 42 is configured to gradually close or open as the pressure of the fluid pressure medium within the outlet of the pressure adjuster approaches or departs from the specified pressure setting of the source pressure adjuster 42, respectively. The embodiment shown in FIG. 1C simply combines the embodiments in FIGS. 1A and 1B, utilizing both mechanisms of the pressure limiter 41 and pressure adjuster 42 as previously explained. The inlet of the pipe connected to the pressure limiter 41 may be placed anywhere between the pressure source 13 and the flow limiters 3 in the embodiments in FIGS. 1A-1C. Thus, the embodiments exampled FIGS. 1A-1C are characterized in that: one pressure source (e.g. a pump) can deliver multiple streams of fluid in parallel to columns in an HPLC system; however, only one pressure can be used at a given time; only one mobile phase can be used at a given time; the mobile phase also serves as the fluid pressure medium directly contacting the pump, which may cause the mobile phase to be contaminated by the pump, resulting in strict requirements on the pump selection.

Figure 2:
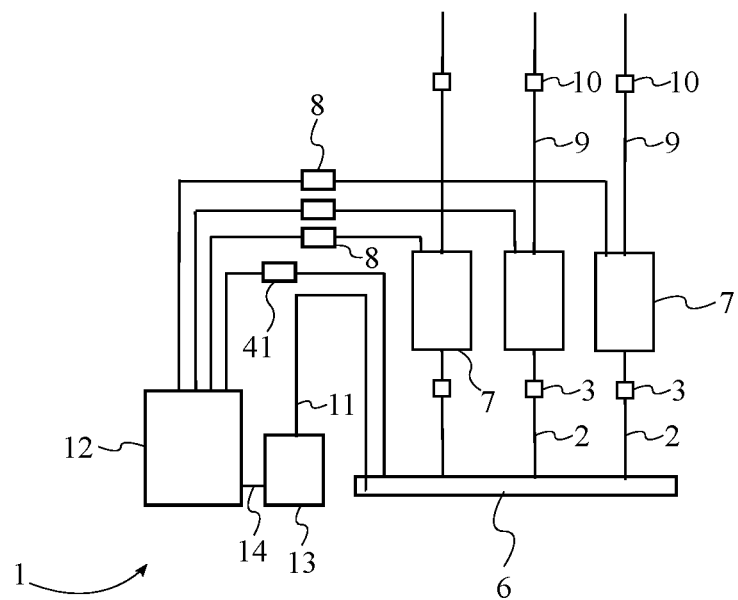
FIG. 2 shows an embodiment of the present invention with plurality of pressure/flow control units.

Some embodiments of the present invention further comprise a pressure transporter 6, as seen in FIG. 2. The pressure transporter 6 is not always necessary, though desirable in various embodiments. In some cases, In such embodiments, the output 11 of the fluid pressure medium supply 1 is connected to the first plurality of fluid transfer pipes 2 through the pressure transporter 6, wherein the fluid pressure medium supply 1 is configured to drive fluid pressure medium through the output 11 of the fluid pressure medium supply 1 toward the pressure transporter 6, and thus subsequently to the first plurality of fluid transfer pipes 2 and the first plurality of flow limiters 3. Each of the first plurality of fluid transfer pipes 2 is connected to the pressure transporter 6, wherein the pressure transporter 6 is configured to receive fluid pressure medium from the output 11 of the fluid pressure medium supply 1 and deliver fluid pressure medium into each of the first plurality of fluid transfer pipes 2.

One embodiment of the present invention shown in FIG. 2 comprises the pressure transporter 6, a first plurality of pressure containers 7, a first plurality of pressure limiters 8, and a second plurality of fluid transfer pipes 9. Each of the first plurality of pressure containers 7 is connected to one of the first plurality of fluid transfer pipes 2, such that each of the first plurality of flow limiters 3 is positioned between one of the first plurality of pressure containers 7 and the pressure transporter 6. Each of the first plurality of pressure limiters 8 is interconnected between one of the pressure containers 7 and the fluid pressure medium supply 1, and each of the second plurality of fluid transfer pipes 9 is connected to one of the first plurality of pressure containers 7, Thus, each of the first plurality of pressure containers 7 is interconnected between one of the first plurality of fluid transfer pipes 2 and one of the second plurality of fluid transfer pipes 9.

One embodiment, building upon the previous embodiment, comprises a second plurality of flow limiters 10. Each of the second plurality of flow limiters 10 is interconnected with one of the second plurality of fluid transfer pipes 9, wherein each of the first plurality of pressure containers 7 is interconnected with one of the first plurality of flow limiters 3 and with one of the second plurality of flow limiters 10.

The configuration and working mechanism of the embodiment of the system as exampled in FIG. 2 are that: the liquid is driven by the pressure source 13 into the pressure transporter 6, then distributed to each of the pressure containers 7, and subsequently through the corresponding flow limiter 3 through the fluid transfer pipes 2.

The flow passing through the second plurality of flow limiters 10 is more than the downstream flow going into the corresponding first plurality of flow limiters 3, and the surplus flow goes through corresponding pressure limiters 8 to be restored into the fluid reservoir 12 for recirculation (or alternatively, discarded). The source pressure limiter 41 and/or the source pressure adjuster 42 are helpful but not necessary due to the existence of the first plurality of pressure limiters 8. The pressure limiters 8 and corresponding downstream flow limiters 10 with corresponding pipes form a pressure/flow control unit that outputs a stream with given pressure and flow rate; both of the output pressure and flow rate(s) are usually less than the pressure and flow rate of the input stream of this control unit. The pressure/flow control unit itself does not require a pressure generator, i.e. a pump—it only needs the pressure and flow rate of the supplied stream being equal to or greater than that of the output stream of the control unit. The pressure containers 7 are not necessary to have certain volumes and can simply be tee-connection, for example, in this embodiment. The embodiment exampled in FIG. 2 improves on FIG. 1 in that it can output multiple streams with different pressures with only one pressure source (i.e. a pump) operating, but this embodiment can only supply one liquid as the mobile phase at any given time.

Figure 3:
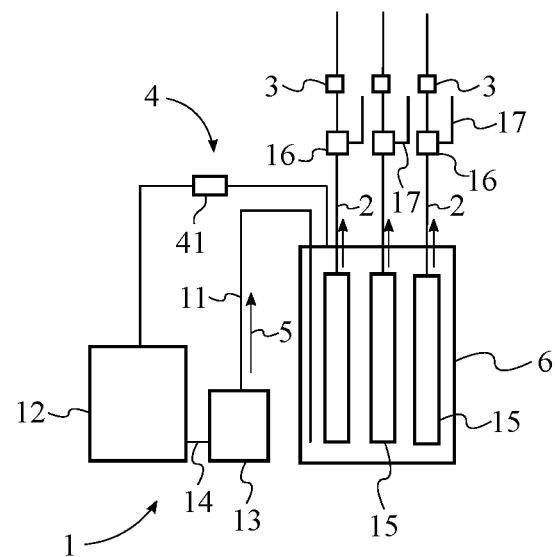
FIG. 3 shows an embodiment of the present invention with use of liquid bags.

FIG. 3 examples the use of liquid bags (fluid delivery inner containers 15) based on an embodiment similar to the structure exampled in FIG. 1. The liquid bags separate different liquids, so that different mobile phases can be used in addition to the fluid pressure medium liquid. Referring to FIG. 3, in some embodiments comprising the pressure transporter 6, the present invention further comprises a plurality of fluid delivery inner containers 15. Furthermore, each of the plurality of fluid delivery inner containers 15 is made of a flexible material and/or any materials with flexible structure that makes the holding capacity of a container flexible. For example, each of the fluid delivery inner containers 15 may be made of a flexible plastic or metallic film or compound films, such as, but not limited to, polyethylene, aluminum composite film, etc. The output 11 of the fluid pressure medium supply 1 is connected to the pressure transporter 6, wherein the fluid pressure medium supply 1 is configured to drive fluid pressure medium through the output 11 of the fluid pressure medium supply 1 toward the transporter. Each of the plurality of fluid delivery inner containers 15 is positioned within the pressure transporter 6, and each of the first plurality of fluid transfer pipes 2 traverses into the pressure transporter 6 and is connected to one of the plurality of fluid delivery inner containers 15. Thus, fluid pressure medium delivered to the interior of the pressure transporter 6 causes the interior pressure of the pressure transporter 6 to rise, compressing the fluid delivery inner containers 15 and driving fluid out of the fluid delivery inner containers 15 through the first plurality of fluid transfer pipes 2. In this case, the output 11 of the fluid pressure medium supply 1 is not directly connected to the first plurality of fluid transfer pipes 2, but rather operatively connected through the pressure relationship between the output 11 of the fluid pressure medium supply 1 and the plurality of fluid delivery inner containers 15.

Furthermore, the present invention may comprise a plurality of tee valves 16 and a plurality of fluid refill pipes 17. Each of the plurality of tee valves 16 is interconnected between one of the plurality of fluid delivery inner containers 15, one of the plurality of flow limiters, and one of the fluid refill pipes 17. Thus, the fluid delivery inner containers 15 may be refilled by delivering fluid through the fluid refill pipes 17.

In the embodiment exampled, in FIG. 3, the fluid pressure medium from the fluid reservoir 12 is driven by the pressure source 13 into the pressure transporter 6, and since the flow into the pressure transporter 6 is set more than the flow pressed out from within the fluid delivery inner containers 15 to the first plurality of flow limiters 3, then when the pressure of the fluid pressure medium in the pressure transporter is higher than the setting of the source pressure limiter 41, it goes through the source pressure limiter 41 and is discarded or returned to the fluid reservoir 12 for recirculation. In the meantime, the mobile phases in the fluid delivery inner containers 15 are pressed out and go through the corresponding tee valves 16 and flow limiters 3 to an HPLC column or other downstream components. The tee valves 16 and fluid refill pipes 17 are not necessary but can make it easy to refill the fluid delivery inner containers 15 when needed.

The embodiment exampled in FIG. 3 improves on those from FIGS. 1 and 2 in that multiple different mobile phases can be used simultaneously in addition to using the fluid pressure medium; the fluid pressure medium is not necessarily a mobile phase, thus can be selected with more suitable liquids instead of having to be the mobile phase; the fluid pressure medium going through the source pressure limiter 41 may not be necessary to be restored into the fluid reservoir 12 for circulation and may be discarded if it is, for example, water. However, this system only has one pressure at any given time.

Figure 4:
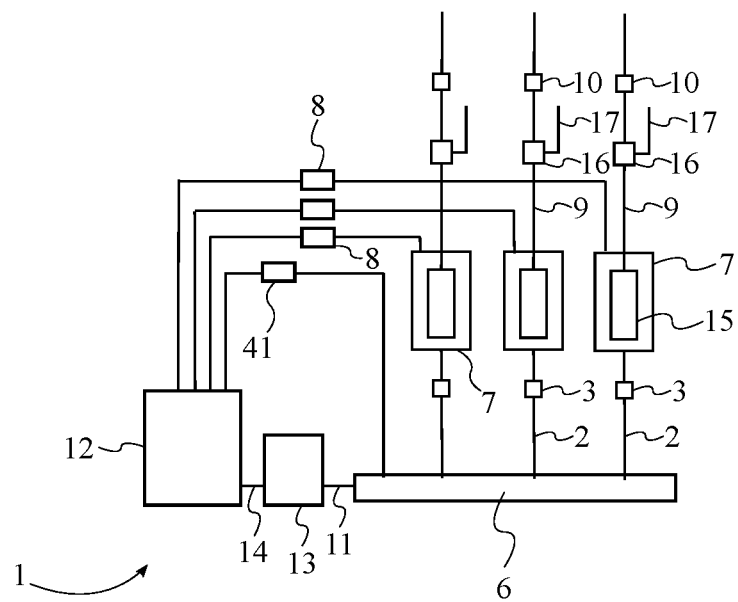
FIG. 4 shows an embodiment of the present invention with combined use of multiple pressure units and liquid bags.

FIG. 4 further examples the use of liquid bags as fluid delivery inner containers 17, based on an embodiment similar to the structure exampled in FIG. 2. The bags separate different liquids, so that different mobile phases can be used in addition to the fluid pressure medium. Referring to FIG. 4, in one embodiment comprising the plurality of pressure containers, the plurality of fluid delivery inner containers 15 is also comprised. In the current embodiment, each of the plurality of fluid delivery inner containers 15 is positioned within one of the first plurality of pressure containers 7, and each of the second plurality of fluid transfer pipes 9 traverses into one of the first plurality of pressure containers 7 and is connected to one of the plurality of fluid delivery inner containers 15. It should be noted that multiple fluid delivery inner containers 15 may be positioned within a single pressure container, thus multiple of the second plurality of fluid transfer pipes 9 may traverse into the single pressure container. The current embodiment may further comprise a plurality of tee valves 16 and a plurality of fluid refill pipes 17, with each of the plurality of tee valves 16 being interconnected with one of the second plurality of fluid transfer pipes 9, one of the plurality of fluid delivery inner containers 15, and one of the plurality of fluid refill pipes 17.

The configuration and working mechanism of the system as exampled in FIG. 4 are that: the fluid pressure medium is driven by the pressure source 13 into the pressure transporter 6 and then distributed into each of the pressure containers 7. Since the flow passing through the first plurality of flow limiters 3 is set more than the flow passing through the second plurality of flow limiters 10, the liquid in the pressure containers 7 builds up its pressure and, when its pressure is higher than the setting of the pressure limiters 8, goes through the pressure limiters 8 to be discarded or restored into the fluid reservoir 12 for circulation. In the meantime, the mobile phases in the fluid delivery inner containers 17 is pressed out and goes through the tee valves 16 and the second plurality of flow limiters 10 to HPLC columns or further downstream components.

The embodiment exampled in FIG. 4 improves on that in FIG. 2 in that multiple/different mobile phases can be used simultaneously in addition to the fluid pressure medium due to the inclusion of the fluid delivery inner containers 15. The embodiment of FIG. 4 improves on FIG. 3 in that multiple/different pressures can be used simultaneously even with only one pressure source 13 operating because of the use of multiple pressure/flow control unites; the gradient mode is possible in addition to isocratic mode of HPLC operation.

Figure 5:
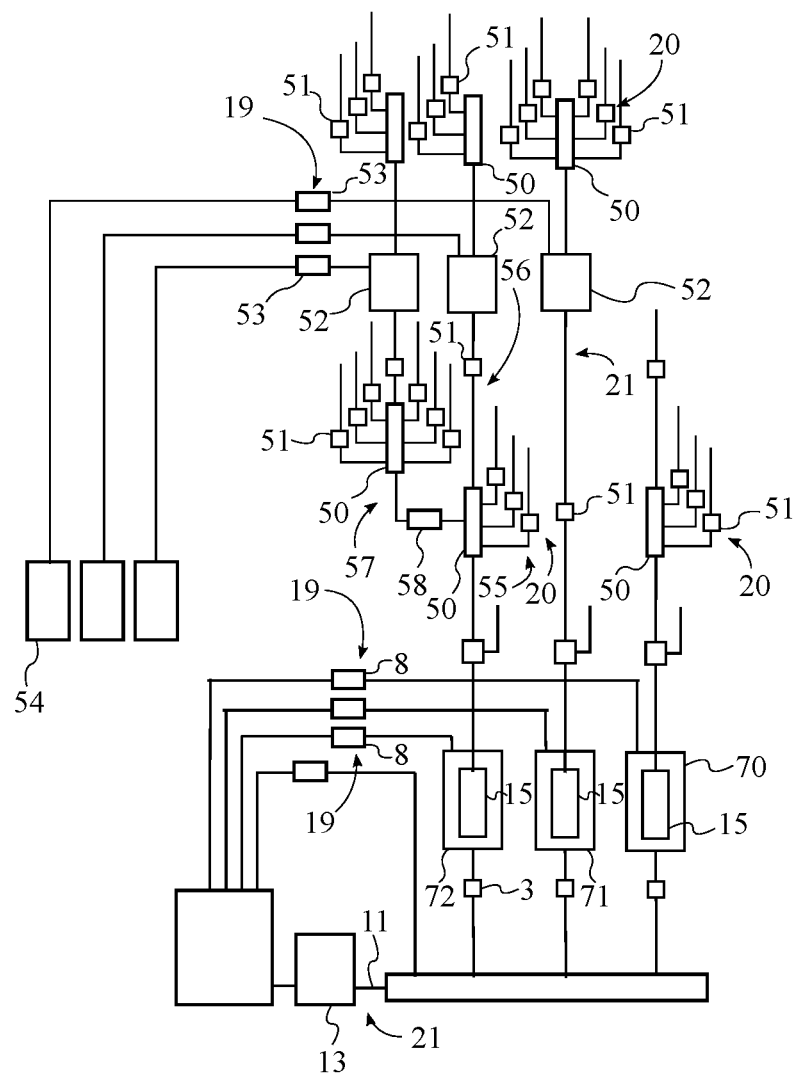
FIG. 5 shows an embodiment of the present invention with various uses of pressure/flow controls.

FIG. 5 examples various uses of pressure/flow controls in an embodiment of the present invention. The configuration and working mechanism of an embodiment of the system as exampled in FIG. 5 are that: fluid pressure medium from the fluid reservoir 12 is driven by the pressure source 13 into the pressure transporter 6, then is distributed into each of the first plurality of pressure containers 7, and the flow going into a pressure container 7 is more than the flow pressed out of the corresponding fluid delivery inner container 15, thus when the pressure of the liquid in the pressure container 7 is higher than the pressure setting of the pressure limiter 8, the liquid goes through the pressure limiter 8 to be disposed of or restored to the fluid reservoir for circulation, thus the liquid pressure in the pressure container 7 is kept stable constantly.

In the meantime, the liquid (usually mobile phase) in the fluid delivery inner container 15 is pressed out and may go through further pressure/flow adjustment or flow redistribution or directly to an HPLC column. FIG. 5 shows three examples of such different configurations.

The mobile phase in the fluid delivery inner container 15 of a first pressure container 70 from the first plurality of pressure containers 7 is pressed out and enters a flow divider 50, where the mobile phase is distributed into multiple streams, each going through a corresponding flow limiter 51 to an HPLC column or to a further pressure/flow adjustment/distribution before going to an HPLC column.

The mobile phase in the fluid delivery inner container 15 of a second pressure container 71 from the first plurality of pressure containers 7 is pressed out of the bag and enters a pressure container 52, where the pressure/flow mobile phase is further adjusted (usually lower than input liquid) by the pressure/flow control unit consisting of a pressure limiter 53 and all flow limiters 51 downstream. Some of the liquid goes through the pressure limiter 53 to be stored in a liquid container 54. The rest of the liquid enters a flow divider 50, where the mobile phase is distributed into multiple streams, each going through a flow limiter 51 to an HPLC column or to a further pressure/flow adjustment/distribution before going to an HPLC column.

The mobile phase in the fluid delivery inner container 15 of a third pressure container 71 from the first plurality of pressure containers 7 is pressed out of the bag and enters a flow divider 50, where the liquid is divided into a first path 55, a second path 56, and a third path 57.

The first path 55 goes through three flow limiters 51 to an HPLC column or to further adjustment before ending at an HPLC column.

The second path 56 goes to a flow limiter 51 and then enters a pressure container 52, where the pressure/flow of the mobile phase is further adjusted by the pressure/flow control unit consisting of the pressure limiter 53 and all corresponding flow limiters 51 downstream, while some of the liquid goes through the pressure limiter 53 to be stored in a liquid container 54. The rest of the liquid enters a flow divider 50, where the mobile phase is distributed into multiple streams, each going through a flow limiter 51 to an HPLC or further adjustment before eventually ending up at an HPLC column or other destination.

The third path 57 goes through a pressure adjuster 58 and a flow divider 50 which connects directly with seven flow limiters 53. The pressure adjuster 58 and the seven flow limiters 53 form a pressure/flow control unit that keeps pressure of the liquid within the unit stable. The flow divider 50 of this unit connects to a pressure container 52 where the pressure of the liquid is further adjusted by the pressure/flow control unit consisting of a pressure limiter 53 and corresponding downstream flow limiters 51.

The embodiment exampled in FIG. 5 improves on FIG. 4 in that various uses of pressure/flow controls can be used, therefore there are more ways to get more output mobile phase streams with different desired pressures and/or flow rates and with gradient mode availability.

In regard to pressure/flow control units: an output stream in applications including HPLC is required to have stable pressure and stable flow rate. This can be achieved by the pressure/flow control units in the present invention with only one pressure generator. A pressure/flow control unit consists of at least one pressure limiter (or pressure adjuster) and one or more flow limiters with proper connections. The inlet of the pressure limiter connects with the inlet of a group of parallel connected flow limiters directly or through a container. The pressure limiter and flow limiters in a pressure/flow control unit share a common input stream or more particularly share the common pressure of the common input stream when inner containers are used. The flow rate of input stream is set to be always greater than the total flow rates of streams output by all of the related flow limiters within the pressure/flow control unit. Therefore, as long as there is liquid overflowing from the pressure limiter constantly, the pressure within the unit should be stable. Since each of the flow limiters has its own flow rate adjustment, the pressure/flow control unit realizes its function of outputting streams that have the same pressure but can have different flow rates. In case of using a pressure adjuster, the downstream pressure is controlled stable by the pressure adjuster, and the output flow rates are controlled by each of the immediate downstream flow limiters. Multiple levels of the pressure/flow control can be formed. The examples of basic embodiment shown in FIG. 1 have one level of pressure/flow control, consisting of the pressure limiter 41 or/and pressure adjuster 42, and multiple flow limiters 3. The embodiment exampled in FIG. 2 has 2 levels of the pressure/flow control, i.e. the level 2 consisting of the pressure limiter 41 and multiple flow limiters 3, in addition to the level 1 just explained before. The embodiment exampled in FIG. 5 has the most (4) levels of pressure/flow control in the route having the pressure adjuster, i.e. the level 1 and level 2 as just described before, the level 3 consisting of the pressure adjuster 58 and the multiple flow limiters 51 immediately downstream, and the level 4 consisting of the pressure limiter 53 and the multiple flow limiters 51 immediately downstream.

Referring again to FIG. 5, the present invention further comprises at least one pressure-flow control unit. Each pressure-flow control unit comprises at least one pressure control unit 19, at least one flow limiter 20, and at least one input 21. In various embodiment, the at least one pressure control unit 19 may comprise either a pressure adjuster, a pressure limiter, or both, configured similarly to prior descriptions herein. The at least one pressure control unit 19 and the at least one flow limiter 20 are connected to each other. The input 21 is connected to each of the at least one pressure control unit 19 and each of the at least one flow limiter 20; that is, each pressure control unit and flow limiter of each pressure-flow control unit share a common input. The output 11 of the pressure source 13 is connected to the input 21 of a source pressure-flow control unit from the at least one pressure-flow control unit, wherein the output 11 of the pressure source 13 acts as the input 21 of the source pressure-flow control unit. More particularly, the at least one pressure control unit 19 of the source pressure-flow control unit comprises the first plurality of pressure limiters 8, while the at least one flow limiter 20 of the source pressure-flow control unit comprises one or more flow limiters 51. The pressure source 13, the source pressure control unit 4, and the first plurality of flow limiters 3 form a first layer of pressure-flow control units.

Figure 6:
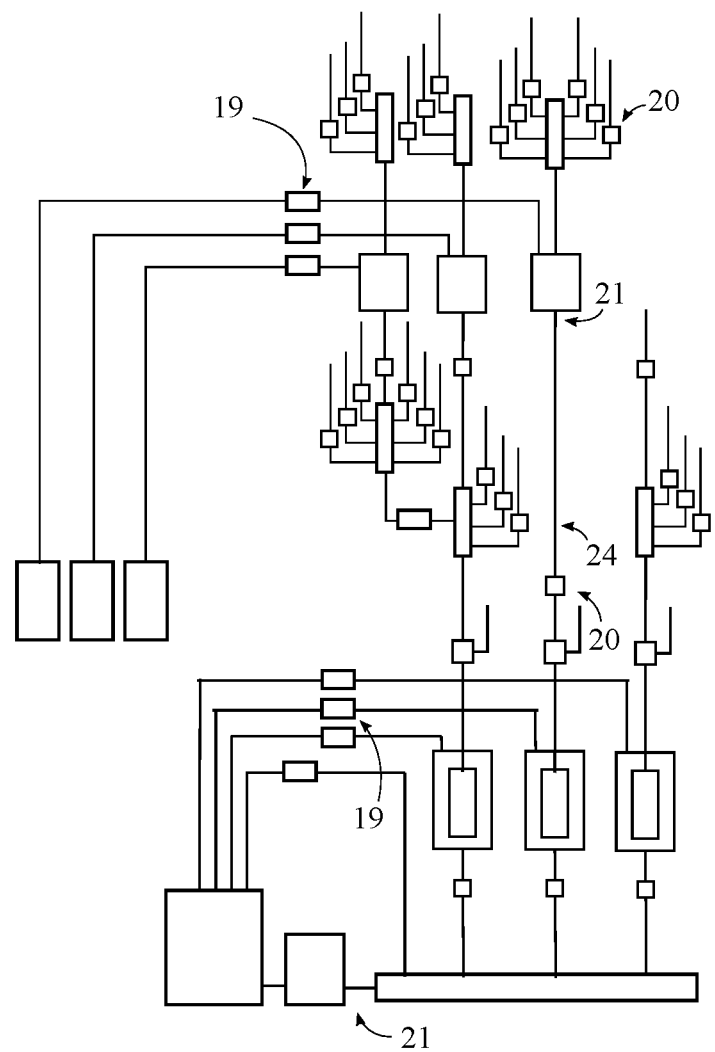
FIG. 6 further illustrates some examples of additional possible constructions of the present invention.

Multiple layers of pressure-flow control units may be added to the system downstream of the source pressure-flow control unit. More particularly, referring to FIG. 6, the at least one pressure-flow control unit comprises an arbitrary pressure-flow control unit and a subsequent pressure-flow control unit. An output 24 of the arbitrary pressure-flow control unit is connected to the input 21 of the subsequent pressure-flow control unit. In some cases, the flow limiters of a pressure-flow control unit may act as outputs connected to the input 21 of a subsequent pressure-flow control unit.

Figure 7:
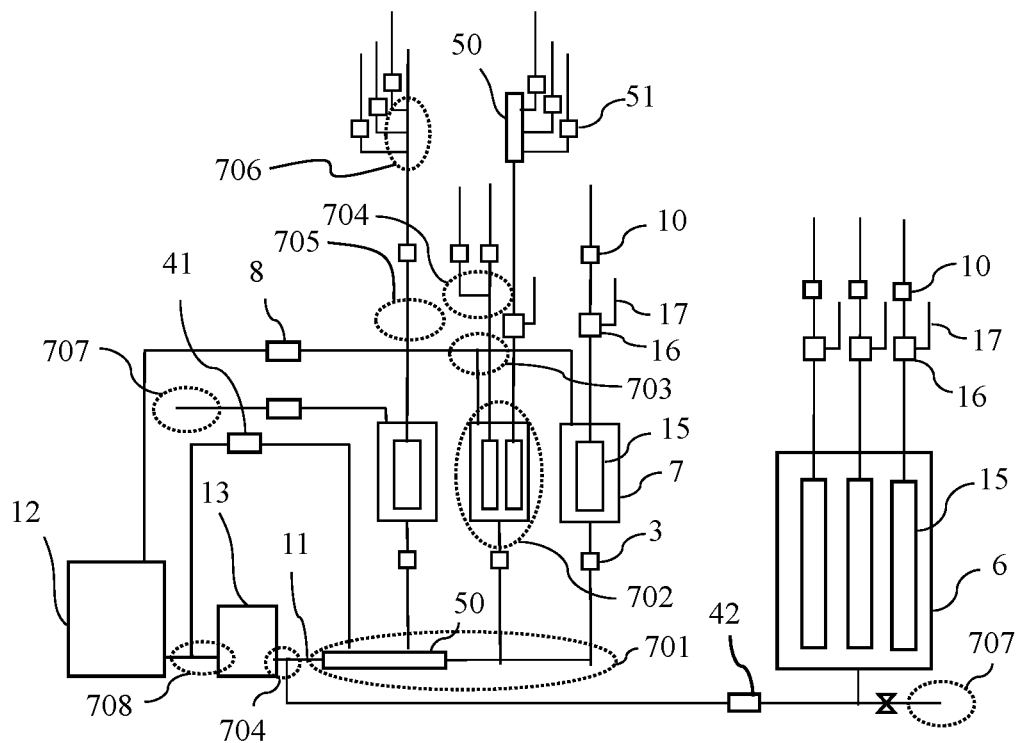
FIG. 7 illustrates some possible examples of variations in configuration of the present invention.

In some cases, the pressure transporter 6 can be replaced with a flow divider and/or some tee connectors as exampled in FIG. 7, because when just holding liquid without bags inside, its liquid-holding capacity is not important. Similar situations are also applicable to the pressure containers 7 in FIGS. 2 and 52 in FIG. 5.

Various containers can be connected to form a connected vessel, and then the connected containers can share some functional structures. As exampled in FIG. 7, two of the three pressure containers 7 form a connected vessel and share one common pressure limiter 8. Since connected containers can share some devices, some devices used before connection may become redundant after forming the connected vessel, such as one of the two flow limiter 3 connected to the two pressure containers 7 forming the connected vessel.

Gradient mode: in embodiments where there are multiple output streams with adjustable pressures/flow rates, gradient applications are possible, although additional other equipment may be required.

FIG. 7 examples some of the possible variations in configuration:

701 illustrates that connection of pipes can be done by through some intermediate such as the flow divider 50 or the pressure transporter 6 (not shown), or by just direct connection of themself (with/without e.g. tee-connector). A flow divider 50 or pressure transporter 6 may be good to have but not necessary.

702 illustrates that multiple bags can co-exist within one pressure container 7.

703 illustrates that multiple pressure containers can share one pressure limiter 8.

704 illustrates more pipes can be added to existing line directly at anywhere to add more functional structures.

705 illustrates that a tee valve 16 and liquid supply pipe 17 can be absent because they are not necessary although good to have.

706 illustrates that pipes can be connected directly to an existing pipe, and a flow divider 50 can be absent because it is not necessary although good to have.

707 illustrates that an overflow fluid pipe or drainpipe may not have to connect to either a fluid reservoir or an input of the pressure source. The overflow fluid or drain fluid can be directed to any other places or just be discarded in some cases, such as water as the fluid pressure medium.

708 illustrates that an overflow fluid pipe can be connected directly to an input of a pressure source, not necessary having to connect to a fluid reservoir 12.

Although the invention has been explained in relation to its preferred embodiment, it is to be understood that many other possible modifications and variations can be made without departing from the spirit and scope of the invention as hereinafter claimed.

What is claimed is:

1. A pressure system for liquid chromatography comprising:
    a fluid pressure medium supply;
    a first plurality of fluid transfer pipes;
    a first plurality of flow limiters;
    a source pressure control unit;
    an output of the fluid pressure medium supply being connected to each of the first plurality of fluid transfer pipes, wherein the fluid pressure medium supply is configured to drive fluid pressure medium through the output of the fluid pressure medium supply toward the first plurality of fluid transfer pipes along a pressure output path;
    each of the first plurality of flow limiters being interconnected with one of the first plurality of fluid transfer pipes, wherein each of the first plurality of flow limiters allows a specified flow rate of fluid through one of the first plurality of fluid transfer pipes;
    the source pressure control unit being configured to regulate the pressure of fluid pressure medium being delivered to the first plurality of fluid transfer pipes from the fluid pressure medium supply;
    the source pressure control unit being a source pressure limiter with a specified pressure setting; and
    the source pressure limiter being interconnected between the output of the fluid pressure medium supply and an input of the fluid pressure medium supply; and
    the source pressure limiter being configured to allow passage of fluid pressure medium with a pressure higher than the specified pressure setting of the source pressure control unit.

2. The pressure system for liquid chromatography of claim 1:
    wherein the fluid pressure medium supply comprises at least one fluid reservoir and a pressure source;
    each fluid reservoir being connected to an input of the pressure source, wherein the pressure source is configured to draw fluid pressure medium from the fluid reservoir into the input of the pressure source and drive the fluid pressure medium through an output of the pressure source, wherein the output of the pressure source is the output of the fluid pressure medium supply.

3. The pressure system for liquid chromatography of claim 1:
    wherein said fluid pressure medium supply comprises a fluid reservoir;
    wherein the source pressure control unit comprises said source pressure limiter and a source pressure adjuster with a specified pressure setting;
    the source pressure limiter being interconnected between the output of the fluid pressure medium supply and the fluid reservoir;
    the source pressure adjuster being interconnected between the output of the fluid pressure medium supply and the first plurality of fluid transfer pipes; and
    the source pressure adjuster being configured to gradually close or open as the pressure of the fluid pressure medium within an outlet of the pressure adjuster approaches or departs from the specified pressure setting of the source pressure adjuster, respectively.

4. The pressure system for liquid chromatography of claim 1, further comprising:
    a pressure transporter;
    a plurality of fluid delivery inner containers;
    the output of the fluid pressure medium supply being connected to the pressure transporter, wherein the fluid pressure medium supply is configured to drive fluid pressure medium through the output of the fluid pressure medium supply toward the pressure transporter;
    each of the plurality of fluid delivery inner containers being positioned within the pressure transporter; and
    each of the first plurality of fluid transfer pipes traversing into the pressure transporter and being connected to one of the plurality of fluid delivery inner containers.

5. The pressure system for liquid chromatography of claim 4, further comprising:
    a plurality of tee valves; and
    a plurality of fluid refill pipes;
    each of the plurality of tee valves being interconnected between one of the plurality of fluid delivery inner containers, one of the first plurality of flow limiters, and one of the plurality of fluid refill pipes.

6. The pressure system for liquid chromatography of claim 1, further comprising:
    at least one pressure-flow control unit;
    each pressure-flow control unit comprising at least one pressure control unit, at least one flow limiter, and at least one input;
    the at least one pressure control unit and the at least one flow limiter being connected to each other;
    the input being connected to each of the at least one pressure control unit and each of the at least one flow limiter; and
    the output of the pressure source being connected to the input of a first pressure-flow control unit from the at least one pressure-flow control unit.

7. The pressure system for liquid chromatography of claim 6:
    wherein the at least one pressure-flow control unit comprises an arbitrary pressure flow control unit and a subsequent pressure-flow control unit; and
    an output of the arbitrary pressure-flow control unit being connected to the input of the subsequent pressure-flow control unit.

8. The pressure system for liquid chromatography of claim 1, further comprising:
    a pressure transporter;
    the output of the fluid pressure medium supply being connected to the first plurality of fluid transfer pipes through the pressure transporter, wherein the fluid pressure medium supply is configured to drive fluid pressure medium through the output of the fluid pressure medium supply toward the pressure transporter;
    each of the first plurality of fluid transfer pipes being connected to the pressure transporter, wherein the pressure transporter is configured to receive fluid pressure medium from the output of the fluid pressure medium supply and deliver fluid pressure medium into each of the first plurality of fluid transfer pipes.

9. The pressure system for liquid chromatography of claim 8, further comprising:
a first plurality of pressure containers;
a first plurality of pressure limiters;
a second plurality of fluid transfer pipes;
each of the first plurality of pressure containers being connected to one of the first plurality of fluid transfer pipes, wherein each of the first plurality of flow limiters is positioned between one of the first plurality of pressure containers and the pressure transporter;
each of the first plurality of pressure limiters being interconnected between one of the pressure containers and the fluid pressure medium supply; and
each of the second plurality of fluid transfer pipes being connected to one of the first plurality of pressure containers, wherein each of the first plurality of pressure containers is interconnected between one of the first plurality of fluid transfer pipes and one of the second plurality of fluid transfer pipes.

10. The pressure system for liquid chromatography of claim 9, further comprising:
a second plurality of flow limiters;
each of the second plurality of flow limiters being interconnected with one of the second plurality of fluid transfer pipes, wherein each of the first plurality of pressure containers is interconnected with one of the first plurality of flow limiters and with one of the second plurality of flow limiters.

11. The pressure system for liquid chromatography of claim 9, further comprising:
a plurality of fluid delivery inner containers;
each of the plurality of fluid delivery inner containers being positioned within one of the first plurality of pressure containers; and
each of the second plurality of fluid transfer pipes traversing into one of the first plurality of pressure containers and being connected to one of the plurality of fluid delivery inner containers.

12. The pressure system for liquid chromatography of claim 11, further comprising:
a plurality of tee valves; and
a plurality of fluid refill pipes;
each of the plurality of tee valves being interconnected with one of the second plurality of fluid transfer pipes, one of the plurality of fluid delivery inner containers, and one of the plurality of fluid refill pipes.

* * * * *